J. J. CATRON.
ANTI-AGITATING DEVICE.
APPLICATION FILED JULY 28, 1919.

1,329,887.

Patented Feb. 3, 1920.

Inventor
J. J. Catron
By Jack H. Athly
Attorney

UNITED STATES PATENT OFFICE.

JOHN J. CATRON, OF BONHAM, TEXAS.

ANTI-AGITATING DEVICE.

1,329,887.  Specification of Letters Patent.  Patented Feb. 3, 1920.

Application filed July 28, 1919. Serial No. 313,921.

*To all whom it may concern:*

Be it known that I, JOHN J. CATRON, a citizen of the United States, residing at Bonham, in the county of Fannin and State of Texas, have invented certain new and useful Improvements in Anti-Agitating Devices, of which the following is a specification.

This invention relates to improvements in anti-agitating devices for liquid dispensers.

In dispensers where the liquid, such as gasolene, is pumped into a measuring cylinder, considerable agitation is set up by the inflowing liquid. This condition interferes with the expeditious measuring as time must be given the liquid to settle so that its exact level in the cylinder may be determined.

I propose to overcome this in a very simple and inexpensive manner by placing in the lower portion of the cylinder a device for counteracting the whirling motion of the inflowing liquid.

In carrying out the invention I place a foraminous plate at the lower end of the measuring cylinder and surrounding the central overflow pipe and above the supply pipe, which delivers the liquid to the cylinder.

Figure 1:
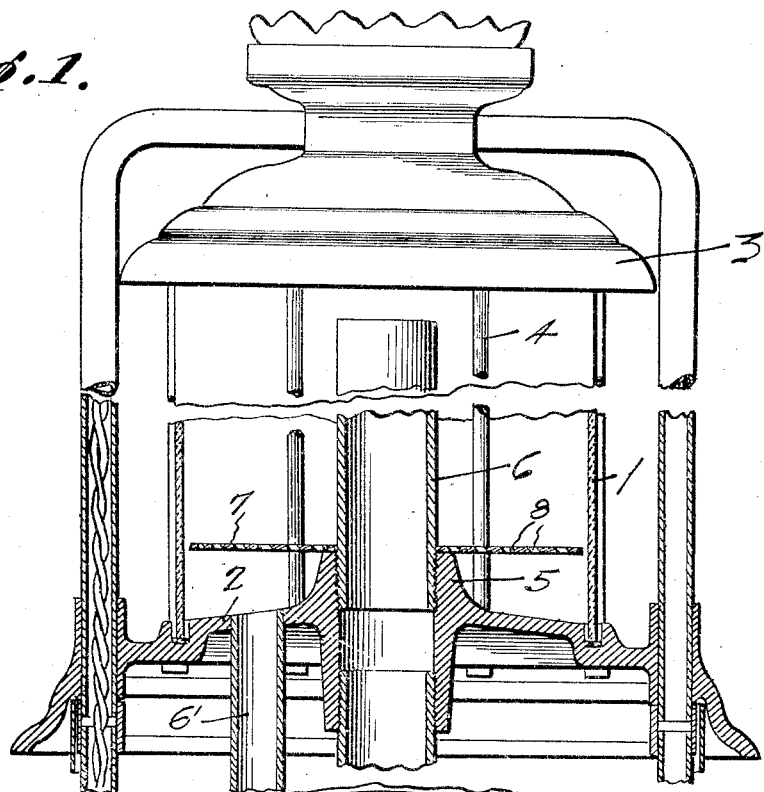
Figure 2:
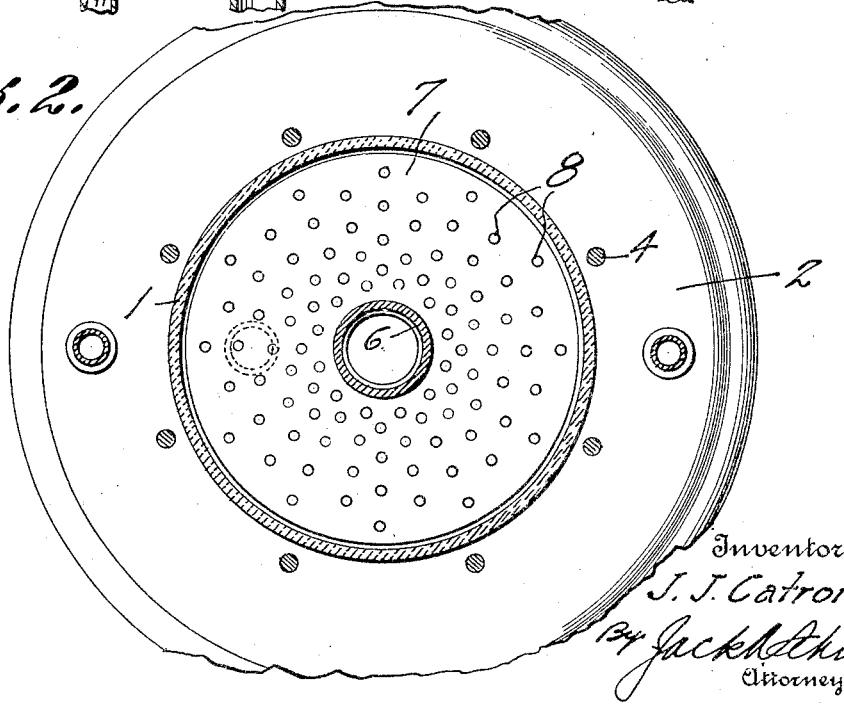

The invention will be more readily understood from a reading of the following specification and by reference to the accompanying drawings, in which an example of the invention is shown and wherein:

Figure 1 is a broken view of the upper portion of a liquid dispenser, the upper part being illustrated in elevation and the lower part in section, a disk embodying the invention being arranged at the bottom of the cylinder, and Fig. 2 is a cross-sectional view of the same.

In the drawing the numeral 1 designates a glass measuring cylinder seated on a base 2 and covered by a cap 3 secured to the base by vertical rods 4. The base 2 has a central upstanding nipple 5 and an overflow or pipe 6 is screwed into the nipple and has its upper end terminating a short distance below the top of the cylinder. A supply pipe 6' is connected to the base 2. These parts are part of the dispenser and the invention is used in connection therewith.

I provide a disk 7 conforming to the inner contour of the cylinder and slightly less in diameter than the inner diameter of the latter. This disk has a central opening snugly receiving the pipe 6 so that the disk will rest on the nipple 5 and thus be supported above the base 2 and the supply pipe. The disk is provided with perforations 8, which as shown in Fig. 2, are more numerous and closer together at the central portion, although this may be varied. Good results are had by disposing the perforations radially.

When liquid is supplied to the cylinder by the pipe 6' it flows in a stream into the lower end of the cylinder 1. The liquid develops a whirling motion, so that the agitation is more violent at the center of the cylinder; the result being that the liquid foams thereby making it impossible to determine the exact level until the agitation has subsided, which occurs only after the supply is cut-off.

By employing the disk the inflowing liquid encounters the perforations which check the whirling motion and this counter-action causes the liquid to rise in the cylinder in a smooth and solid body; thereby enabling the dispenser to shut-off the supply instantly at the exact level and avoiding overflowing the cylinder or the loss of time waiting for the liquid to settle.

It is obvious that any foraminous structure properly made, could be used.

What I claim, is:

In combination, a cylindrical glass measuring vessel, a base on which said vessel stands with its axis extending vertically, a perforated boss in substantially the center of said base and extending to a height thereabove within the vessel, an overflow pipe fitted within said boss and rising to the upper portion of said vessel, an inlet pipe extending through said base at one side of the boss, and a metallic thin disk having a central perforation fitting about said overflow pipe and resting on the top of said boss in spaced relation above the inlet, said plate being of a diameter slightly less than the measuring vessel, said plate also having numerous small perforations arranged radially and being more numerous in the center.

In testimony whereof I affix my signature.

JOHN J. CATRON.